March 30, 1926.
A. F. MOELLER
LAND ROLLER
Filed Jan. 24, 1924
1,578,752
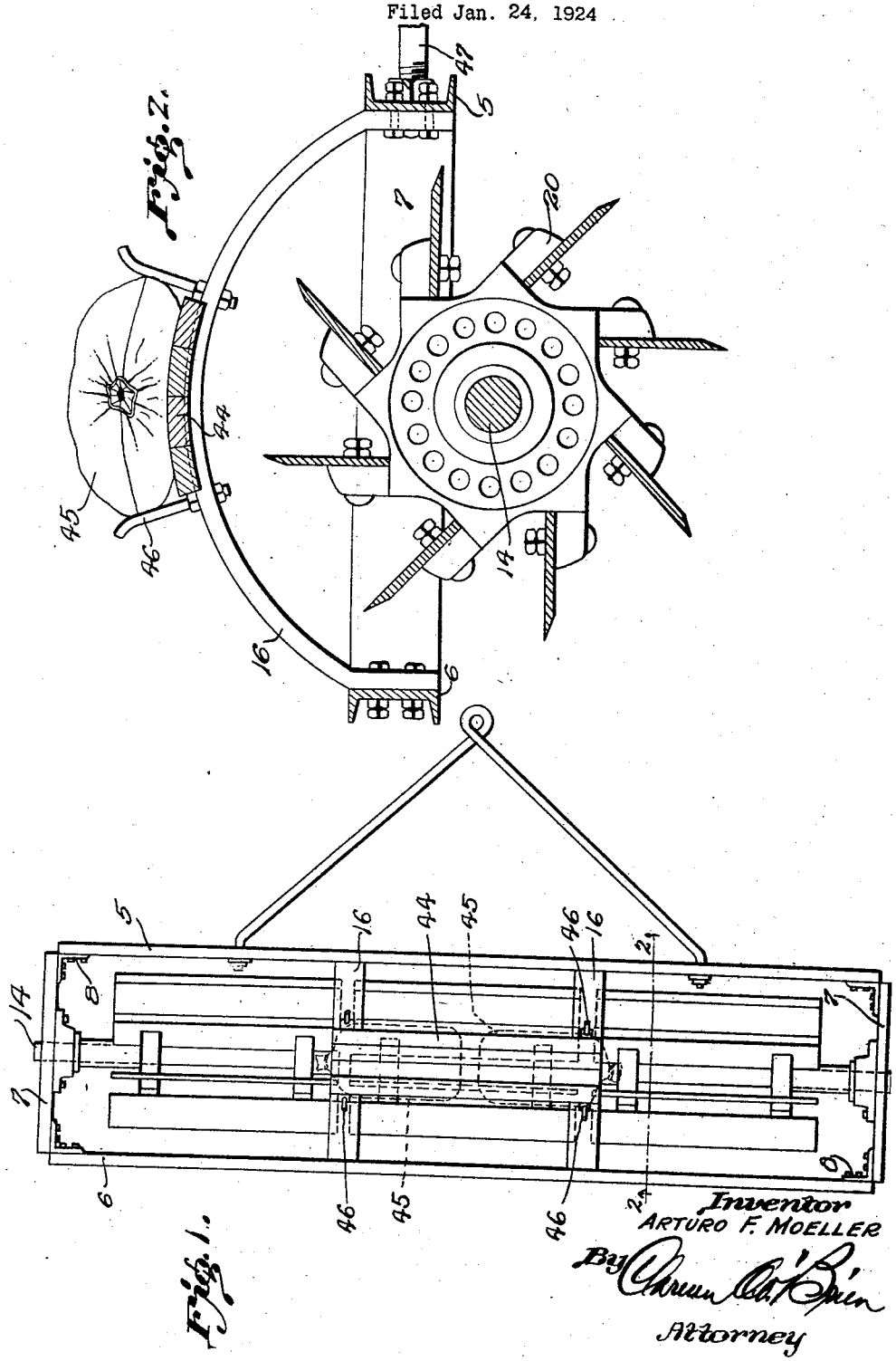
Inventor
ARTURO F. MOELLER Patented Mar. 30, 1926.

1,578,752

UNITED STATES PATENT OFFICE.

ARTURO F. MOELLER, OF SAN PEDRO, MEXICO.

LAND ROLLER.

Application filed January 24, 1924. Serial No. 688,261.

*To all whom it may concern:*

Be it known that I, ARTURO F. MOELLER, a citizen of the United States, residing at San Pedro, Coahuila, Mexico, have invented certain new and useful Improvements in Land Rollers, of which the following is a specification.

The present invention relates to certain new and useful improvements in land rollers, and has for its principal object to provide a novel supporting structure for weighting material such as sacks of earth or other heavy material.

In the drawing, Fig. 1 is a top plan view of the implement embodying my invention, and Fig. 2 is an enlarged fragmentary longitudinal sectional view, taken substantially on the line 2—2 of Fig. 1.

Referring to the drawing in detail, the present invention embodies a rectangular open frame elongated transversely as shown in Fig. 1, and preferably composed of a front bar 5, a rear bar 6, and a pair of end bars 7, rigidly connected in end to end relation at the corners of the frame by means of angle pieces 8 that are riveted or otherwise secured in place.

The frame bars 5, 6 and 7 are preferably of channel cross section as shown in Fig. 2, with their flanges directed outwardly, the angle irons 8 being riveted to the webs of the frame members. A shaft 14 is journaled to extend transversely of the frame and has mounted thereon a drum 20 of any suitable construction. The front and rear frame bars 5 and 6 are connected by means of a pair of spaced arch members 6 that are arranged at opposite sides of the longitudinal center of the frame and which have their ends suitably secured as by means of bolts or rivets to the frame bars 5 and 6 against the inner surfaces of the webs thereof.

Besides forming a special function under certain conditions as will presently become apparent, these arch members 16 serve to reinforce the frame.

The cross bars or slats 44 are disposed upon the arch member 16 transversely of the implement frame for supporting reception of a suitable weighting means such as a sack 45, filled with earth or other suitable heavy material. The slats 44 are retained in place by providing the ends of the same with grooves as is indicated by dotted lines in Fig. 2, in which the central portions of the arch members 16 may seat, and in order to retain the sack 45 upon the slats 44, outstanding pins 46 movably secured in the arch members 16 at the edges of the platform formed by the slats 44.

What I claim as new is:

1. In an agricultural implement of the class described, a rectangular frame of the open type, a pair of arch members disposed between the longitudinal sides of the frame, a plurality of slats lying alongside of each other on the intermediate portions of the arch members, and a pair of pins projecting through each arch member for holding the slats in place thereon and projecting above the slats for maintaining weight material on the slats.

2. In an agricultural implement of the class described, a rectangular open frame, a pair of arch members disposed transversely of the frame, a plurality of slats having transversely extending alining grooves for receiving the arch members, pins extending through the arch members one on each side of the plurality of slats.

In testimony whereof I affix my signature.

ARTURO F. MOELLER.